US008391413B2

(12) United States Patent
Mantravadi et al.

(10) Patent No.: US 8,391,413 B2
(45) Date of Patent: *Mar. 5, 2013

(54) CHANNEL ESTIMATION FOR AN OFDM COMMUNICATION SYSTEM WITH INACTIVE SUBBANDS

(75) Inventors: Ashok Mantravadi, San Diego, CA (US); Aamod Khandekar, San Diego, CA (US); Edward H. Teague, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1652 days.

This patent is subject to a terminal disclaimer.

(21) Appl. No.: 10/741,524

(22) Filed: Dec. 19, 2003

(65) Prior Publication Data

US 2005/0135509 A1 Jun. 23, 2005

(51) Int. Cl.
*H03K 9/00* (2006.01)
(52) U.S. Cl. ........ 375/316; 375/340; 375/260; 375/227; 375/354; 375/144; 370/206; 370/203; 370/208; 370/210
(58) Field of Classification Search .................. 375/340, 375/354, 227, 316, 260, 144; 370/208, 206, 370/203, 210
See application file for complete search history.

(56) References Cited

U.S. PATENT DOCUMENTS

| 5,307,376 A | | 4/1994 | Castelain et al. | |
|---|---|---|---|---|
| 5,886,844 A | * | 3/1999 | Shimizu | 360/65 |
| 6,771,591 B1 | * | 8/2004 | Belotserkovsky et al. | 370/210 |
| 6,775,340 B1 | * | 8/2004 | Arslan et al. | 375/354 |
| 7,012,882 B2 | * | 3/2006 | Wang et al. | 370/208 |
| 7,099,270 B2 | * | 8/2006 | Yamaguchi | 370/208 |
| 2003/0072254 A1 | | 4/2003 | Ma et al. | |
| 2003/0108127 A1 | * | 6/2003 | Eilts et al. | 375/340 |
| 2004/0184399 A1 | * | 9/2004 | Chiou | 370/206 |
| 2006/0203710 A1 | * | 9/2006 | Mukkavilli et al. | 370/208 |

FOREIGN PATENT DOCUMENTS

| EP | 1014636 | 6/2000 |
|---|---|---|
| JP | 0575568 | 3/1993 |
| JP | 2002009726 A | 1/2002 |

(Continued)

OTHER PUBLICATIONS

Cheng Li et al., "Pilot-Based Carrier Frequency Offset Estimation In OFDM Systems," IEEE, vol. 2, pp. 874-878, Dec. 2003.

(Continued)

*Primary Examiner* — Eva Puente
(74) *Attorney, Agent, or Firm* — Fulbright & Jaworski L.L.P.

(57) ABSTRACT

For channel estimation in a spectrally shaped wireless communication system, an initial frequency response estimate is obtained for a first set of P uniformly spaced subbands (1) based on pilot symbols received on a second set of subbands used for pilot transmission and (2) using extrapolation and/or interpolation, where P is a power of two. A channel impulse response estimate is obtained by performing a P-point IFFT on the initial frequency response estimate. A final frequency response estimate for N total subbands is derived by (1) setting low quality taps for the channel impulse response estimate to zero, (2) zero-padding the channel impulse response estimate to length N, and (3) performing an N-point FFT on the zero-padded channel impulse response estimate. The channel frequency/impulse response estimate may be filtered to obtain a higher quality channel estimate.

45 Claims, 5 Drawing Sheets

FOREIGN PATENT DOCUMENTS

| | | |
|---|---|---|
| JP | 2002164865 | 6/2002 |
| JP | 2002335556 A | 11/2002 |
| JP | 2002335557 A | 11/2002 |
| JP | 2003078580 A | 3/2003 |
| JP | 2003218827 A | 7/2003 |
| JP | 2003229831 | 8/2003 |
| WO | 9211708 | 7/1992 |

OTHER PUBLICATIONS

Abdelkefi F et al., "A Necessary Condition on the Location of Pilot Tones for Impulse Noise Cancellation in OFDM System and its Applications in Hiperlan2," IEEE, vol. 7, pp. 883-884, Dec. 1, 2003.

Yuping Zhao et al., "A Novel Channel Estimation Method for OFDM Mobile Communication Systems Based on Pilot Signals and Transform-Domain Processing," IEEE, vol. 3, pp. 2089-2093, May 4, 1997.

Coleri, S. et al, "Channel Estimation Techniques Based on Pilot Arrangement in OFDM Systems" IEEE Transactions on Broadcastings, vol. 48, No. 3, Sep. 2002.

International Search Report—PCT/US04/043029, International Search Authority—European Patent Office—Aug. 1, 2005.

Written Opinion—PCT/US04/043029, International Search Authority—European Patent Office—Aug. 1, 2005.

International Preliminary Report on Patentability—PCT/US04/043029, The IPEA/US, Virginia, US—Feb. 28, 2006.

European Search Report—EP04815145, Search Authority—Munich Patent Office—Feb. 2, 2007.

Abdelkefi, et al.: "A Necessary Condition on the Location of Pilot Tones for Impulse Noice Cancellation in OFDM System and Its Applications in Hiperlan2," Globecom Mar. 2003—IEEE Global Telecom. Conf. Proc. San Francisco, Dec. 1-5, 2003, IEEE US vol. 7 of 7, ISBN: 0-7803-7974-8.

Baltersee: On the Capacity of Multiple-Input Multiple-Output Wireless Systems with Data-Aided Channel Estimation, PhD Thesis, RWTH Aachen, Oct. 2002, ISBN: 3-8322-0971-9.

Coleri, et al., "Channel Estimation techniques Based on Pilot Arrangement in OFDM Systems" IEEE Transactions on Broadcastings, vol. 48, No. 3, Sep. 2002.

Li, et al.: "Pilot-Based Carrier Frequency Offset Estimation in OFDM Systems," ICICS-PCM 2003, Dec. 15-18, 2003, pp. 874-878, ISBN: 0-7803-8185-8.

Zhao, et al.: "A Novel Channel Estimation Method for OFDM Mobile Communication Systems Based on Pilot Signals and Transform-Domain Processing," Proc. Veh.Technol. Conf., May 1997, pp. 2089-2093, ISBN: 0-7803-3659-3.

* cited by examiner

CHANNEL ESTIMATION FOR AN OFDM COMMUNICATION SYSTEM WITH INACTIVE SUBBANDS

BACKGROUND

I. Field

The present invention relates generally to data communication, and more specifically to techniques for performing channel estimation in an orthogonal frequency division multiplexing (OFDM) communication system.

II. Background

OFDM is a multi-carrier modulation technique that effectively partitions the overall system bandwidth into multiple (N) orthogonal subbands. These subbands are also referred to as tones, subcarriers, bins, and frequency channels. With OFDM, each subband is associated with a respective subcarrier that may be modulated with data.

In a wireless communication system, a radio frequency (RF) modulated signal may travel via a number of signal paths from a transmitter to a receiver. If the signal paths have different delays, then the received signal at the receiver would include multiple instances of the transmitted signal with different gains and delays. This time dispersion in the wireless channel causes frequency selective fading, which is characterized by a frequency response that varies across the system bandwidth. For an OFDM system, the N subbands may thus experience different effective channels and may consequently be associated with different complex channel gains.

An accurate estimate of the wireless channel between the transmitter and the receiver is normally needed in order to effectively receive data on the available subbands. Channel estimation is typically performed by sending a pilot from the transmitter and measuring the pilot at the receiver. Since the pilot is made up of modulation symbols that are known a priori by the receiver, the channel response can be estimated as the ratio of the received pilot symbol over the transmitted pilot symbol for each subband used for pilot transmission.

Pilot transmission represents overhead in the OFDM system. Thus, it is desirable to minimize pilot transmission to the extent possible. This can be achieved by sending pilot symbols on a subset of the N total subbands and using these pilot symbols to derive channel estimates for all subbands of interest. As described below, the computation to derive the channel estimates can be great for certain systems such as, for example, (1) a spectrally shaped system that does not transmit data/pilot near the band edges and (2) a system that cannot transmit data/pilot on certain subbands (e.g., zero or DC subband). There is therefore a need in the art for techniques to efficiently estimate the channel response for these systems.

SUMMARY

Techniques to efficiently derive a frequency response estimate for a wireless channel in an OFDM system with inactive subbands are described herein. These techniques may be used for an OFDM system that transmits pilot on subbands that are not uniformly distributed across the N total subbands. An example of such a system is a spectrally shaped OFDM system in which only M subbands, which are centered among the N total subbands, are used for data/pilot transmission and the remaining N−M subbands at the two band edges are not used and served as guard subbands. The inactive subbands may thus be the guard subbands, DC subband, and so on.

For the channel estimation, an initial frequency response estimate is obtained for a first set of P uniformly spaced subbands based on, for example, pilot symbols received on a second set of subbands used for pilot transmission, where P is an integer that is a power of two. The first set includes at least one subband not included in the second set (e.g., pilot subbands among the guard subbands). Moreover, the subbands in the first set are uniformly spaced apart by N/P subbands. Extrapolation and/or interpolation may be used, as necessary, to obtain the initial frequency response estimate.

A time-domain channel impulse response estimate for the wireless channel is then derived based on the initial frequency response estimate, for example, by performing a P-point inverse fast Fourier transform (IFFT). A final frequency response estimate for the N total subbands is then derived based on the channel impulse response estimate. This may be achieved, for example, by (1) setting low quality taps in the channel impulse response estimate to zero and retaining the remaining taps, (2) zero-padding the channel impulse response estimate to length N, and (3) performing an N-point fast Fourier transform (FFT) on the zero-padded channel impulse response estimate to obtain the final frequency response estimate. The channel impulse response estimates or frequency response estimates for multiple OFDM symbols may be filtered to obtain a higher quality channel estimate for the wireless channel.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
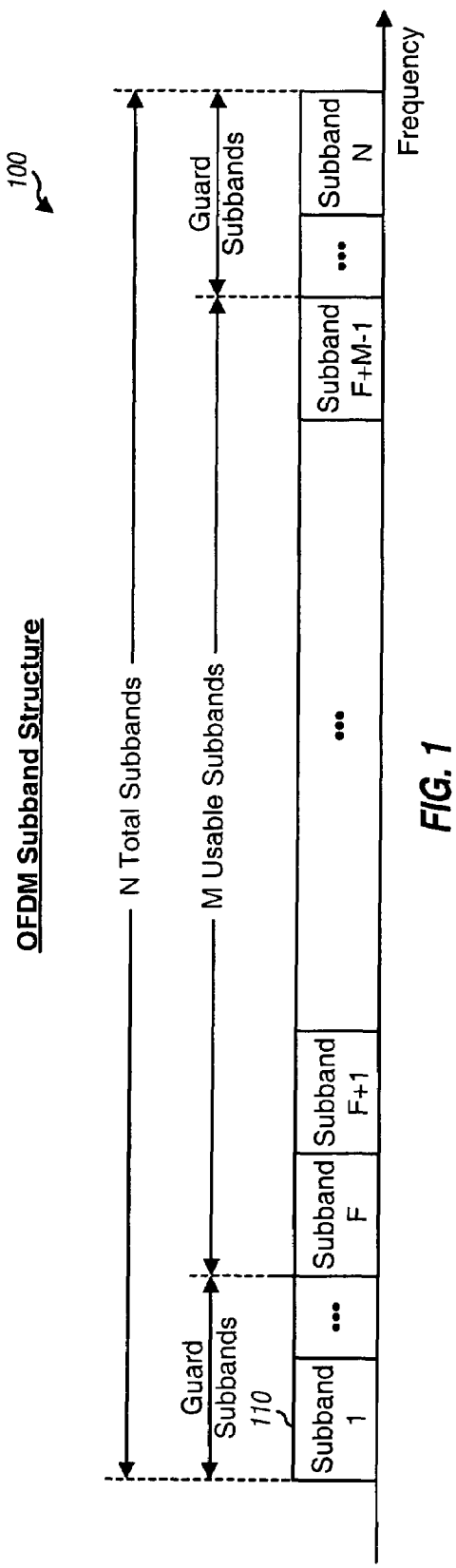
FIG. 1 shows an exemplary subband structure for an OFDM system.

FIG. 1 shows an exemplary subband structure 100 that may be used for an OFDM system. The OFDM system has an overall system bandwidth of BW MHz, which is partitioned into N orthogonal subbands using OFDM. Each subband has a bandwidth of BW/N MHz. In a spectrally shaped OFDM system, only M of the N total subbands are used for data/pilot transmission, where M<N. The remaining N−M subbands are not used for data/pilot transmission and serve as guard subbands to allow the OFDM system to meet spectral mask requirements. The M usable subbands include subbands F through F+M−1 and are typically centered among the N total subbands.

The N subbands of the OFDM system may experience different channel conditions (e.g., different fading and multipath effects) and may be associated with different complex channel gains. An accurate estimate of the channel response is normally needed to process (e.g., demodulate and decode) data at a receiver.

The wireless channel in the OFDM system may be characterized by either a time-domain channel impulse response $h_{N \times 1}$ or a corresponding frequency-domain channel frequency response $H_{N \times 1}$. As used herein, and which is consistent with conventional terminology, a "channel impulse response" is a time-domain response of the channel, and a "channel frequency response" is a frequency-domain response of the channel. The channel frequency response $H_{N \times 1}$ is the discrete Fourier transform (DFT) of the channel impulse response $h_{N \times 1}$. This relationship may be expressed in matrix form, as follows:

$$H_{N \times 1} = W_{N \times N} h_{N \times 1}, \qquad \text{Eq. (1)}$$

where $h_{N \times 1}$ is an N×1 vector for the impulse response of the wireless channel between a transmitter and a receiver in the OFDM system;

$H_{N \times 1}$ is an N×1 vector for the frequency response of the wireless channel; and $W_{N \times N}$ is an N×N DFT matrix used to perform the DFT on $h_{N \times 1}$ to obtain $H_{N \times 1}$.

The DFT matrix $W_{N \times N}$ is defined such that the (n,m)-th entry $w_{n,m}$ is given as:

$$w_{n,m} = e^{-j2\pi \frac{(n-1)(m-1)}{N}}, \text{ for } n = \{1 \ldots N\} \text{ and } m = \{1 \ldots N\}, \qquad \text{Eq. (2)}$$

where n is a row index and m is a column index.

The impulse response of the wireless channel can be characterized by L taps, where L is typically much less than the number of total subbands (i.e., L<N). That is, if an impulse is applied to the wireless channel by the transmitter, then L time-domain samples (at the sample rate of BW MHz) would be sufficient to characterize the response of the wireless channel based on this impulse stimulus. The number of taps (L) for the channel impulse response is dependent on the delay spread of the system, which is the time difference between the earliest and latest arriving signal instances of sufficient energy at the receiver. A longer delay spread corresponds to a larger value for L, and vice versa. The vector $h_{N \times 1}$ includes one non-zero entry for each tap of the channel impulse response. For a delay spread of L, the first L entries of the vector $h_{N \times 1}$ may contain non-zero values and the N−L remaining entries are all zeros.

Because only L taps are needed for the channel impulse response, the channel frequency response $H_{N \times 1}$ lies in a subspace of dimension L (instead of N). The frequency response of the wireless channel may thus be fully characterized based on channel gain estimates for as few as L appropriately selected subbands, instead of all N subbands. Even if channel gain estimates for more than L subbands are available, an improved estimate of the frequency response of the wireless channel may be obtained by suppressing the noise components outside this subspace.

Figure 2:
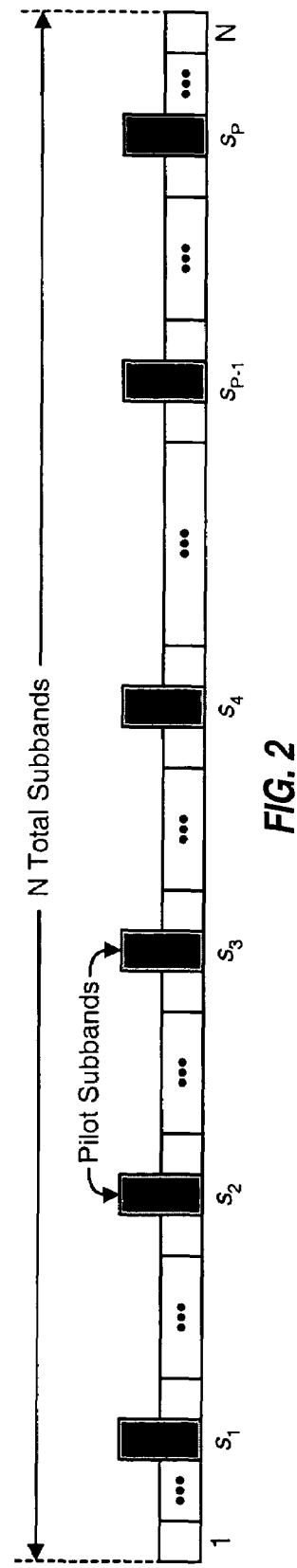
FIG. 2 shows a pilot transmission scheme that may be used to obtain a frequency response estimate of a wireless channel.

FIG. 2 shows a pilot transmission scheme 200 that may be used to obtain a frequency response estimate for the wireless channel in the OFDM system. A pilot symbol is transmitted on each of P pilot subbands, where in general $L \leq P \leq M$. The pilot subbands are distributed among the M usable subbands and have indices of $s_1$ through $s_p$. Typically, the number of pilot subbands is much less than the number of usable subbands (i.e., P<M). The remaining M−P usable subbands may be used for transmission of user-specific data, overhead data, and so on.

The model for the OFDM system may be expressed as:

$$r_{N \times 1} = H_{N \times 1} \circ x_{N \times 1} + n_{N \times 1}, \qquad \text{Eq. (3)}$$

where $x_{N \times 1}$ is an N×1 vector with N "transmit" symbols sent by the transmitter on the N subbands, with zeros being sent on the unused subbands;

$r_{N \times 1}$ is an N×1 vector with N "received" symbols obtained by the receiver for the N subbands;

$n_{N \times 1}$ is an N×1 noise vector for the N subbands; and

"$\circ$" denotes the Hadmard product, which is an element-wise product, where the i-th element of $r_{N \times 1}$ is the product of the i-th elements of $x_{N \times 1}$ and $H_{N \times 1}$.

The noise $n_{N \times 1}$ is assumed to be additive white Gaussian noise (AWGN) with zero mean and a variance of $\sigma^2$.

An initial estimate of the frequency response of the wireless channel, $$\hat{\underline{H}}_{P \times 1}^{init},$$

may be obtained as follows:

$$\hat{\underline{H}}_{P \times 1}^{init} = r_{P \times 1}^p / x_{P \times 1}^p = H_{P \times 1}^p + n_{P \times 1}^p / x_{P \times 1}^p, \qquad \text{Eq (4)}$$

where $x_{P \times 1}^p$ is a P×1 vector with P pilot symbols sent on the P pilot subbands;

$r_{P \times 1}^p$ is a P×1 vector with P received pilot symbols for the P pilot subbands;

$H_{P \times 1}^p$ is a P×1 vector for the actual frequency response of the P pilot subbands;

$\hat{H}_{P \times 1}^{init}$ is a P×1 vector for the initial frequency response estimate;

$n_{P \times 1}^p$ is a P×1 noise vector for the P pilot subbands; and $r_{P \times 1}^p / x_{P \times 1}^p = [\hat{P}(s_1)/P(s_1) \; \hat{P}(s_2)/P(s_2) \; \ldots \; \hat{P}(s_p)/P(s_p)]^T$, where $\hat{P}(s_i)$ and $P(s_i)$ are respectively the received and transmitted pilot symbols for pilot subband $s_i$.

The P×1 vectors $x_{P \times 1}^p$, $r_{P \times 1}^p$, and $n_{P \times 1}^p$ include only P entries of the N×1 vectors $x_{N \times 1}$, $r_{N \times 1}$ and $n_{N \times 1}$, respectively, corresponding to the P pilot subbands. As shown in equation (4), the receiver can obtain the initial frequency response estimate $$\hat{\underline{H}}_{P \times 1}^{init}$$

based on P element-wise ratios of the received pilot symbols to the transmitted pilot symbols for the P pilot subbands, i.e., $$\hat{\underline{H}}_{P \times 1}^{init} = [\hat{H}(s_1) \; \hat{H}(s_2) \ldots \hat{H}(s_p)]^T,$$

where $\hat{H}(s_i) = \hat{P}(s_i)/P(s_i)$ is the channel gain estimate for subband $s_i$. The vector $$\hat{\underline{H}}_{P \times 1}^{init}$$

is indicative of the frequency response of the wireless channel for the P pilot subbands.

A frequency response estimate for the N total subbands may be obtained based on the initial frequency response estimate $$\hat{\underline{H}}_{P\times 1}^{init}$$

using various techniques. For a direct least-squares estimation technique, a least square estimate of the impulse response of the wireless channel is first obtained based on the following optimization:

$$\hat{\underline{h}}_{L\times 1}^{ls} = \min_{\underline{h}_{L\times 1}} \left\| \hat{\underline{H}}_{P\times 1}^{init} - \underline{W}_{P\times L} \underline{h}_{L\times 1} \right\|^2, \qquad \text{Eq (5)}$$

where $h_{L\times 1}$ is an L×1 vector for a hypothesized impulse response of the wireless channel;
$W_{P\times L}$ is a P×L sub-matrix of $W_{N\times N}$; and
$\hat{h}_{L\times 1}^{ls}$ is an L×1 vector for the least square channel impulse response estimate.

The matrix $W_{P\times L}$ contains P rows of the matrix $W_{N\times N}$ corresponding to the P pilot subbands. Each row of $W_{P\times L}$ contains L elements, which are the first L elements of the corresponding row of $W_{N\times N}$. The optimization in equation (5) is over all possible channel impulse responses $h_{L\times 1}$. The least square channel impulse response estimate $\hat{h}_{L\times 1}^{ls}$ is equal to the hypothesized channel impulse response $h_{L\times 1}$ that results in minimum mean square error between the initial frequency response estimate $$\hat{\underline{H}}_{P\times 1}^{init}$$

and the frequency response corresponding to $h_{L\times 1}$, which is given by $W_{P\times L} h_{L\times 1}$.

The solution to the optimization problem posed in equation (5) may be expressed as:

$$\hat{h}_{L\times 1}^{ls} = (W_{P\times L}^H W_{P\times L})^{-1} W_{P\times L}^H \hat{H}_{P\times 1}^{init}. \qquad \text{Eq. (6)}$$

The frequency response estimate for the wireless channel may then be derived from the least square channel impulse response estimate, as follows:

$$\hat{H}_{N\times 1}^{ls} = W_{N\times L} \hat{h}_{L\times 1}^{ls}, \qquad \text{Eq. (7)}$$

where $W_{N\times L}$ is an N×L matrix with the first L columns of $W_{N\times N}$; and
$\hat{H}_{N\times 1}^{ls}$ is an N×1 vector for the frequency response estimate for all N subbands.

The vector $\hat{H}_{N\times 1}^{ls}$ can be computed in several manners. For example, the vector $\hat{h}_{L\times 1}^{ls}$ can be computed first as shown in equation (6) and then used to compute the vector $\hat{H}_{N\times 1}^{ls}$ as shown in equation (7). For equation (6), $(W_{P\times L}^H W_{P\times L})^{-1} W_{P\times L}^H$ is an L×P matrix that can be pre-computed. The impulse response estimate $\hat{h}_{L\times 1}^{ls}$ can then be obtained with L·P complex operations (or multiplications). For equation (7), the frequency response estimate $\hat{H}_{N\times 1}^{ls}$ can be more efficiently computed by (1) extending the L×1 vector $\hat{h}_{L\times 1}^{ls}$ (with zero padding) to obtain an N×1 vector $\hat{h}_{N\times 1}^{ls}$ and (2) performing an N-point FFT on $\hat{h}_{N\times 1}^{ls}$, which requires 0.5 N·log N complex operations. The frequency response estimate $\hat{H}_{N\times 1}^{ls}$ can thus be obtained with a total of (L·P+0.5 N·log N) complex operations for both equations (6) and (7).

Alternatively, the vector $\hat{H}_{N\times 1}^{ls}$ can be computed directly from the vector $\hat{H}_{P\times 1}^{init}$ by combining equations (6) and (7), as follows:

$$\hat{\underline{H}}_{N\times 1}^{ls} = \underline{W}_{N\times L} (\underline{W}_{P\times L}^H \underline{W}_{P\times L})^{-1} \underline{W}_{P\times L}^H \hat{\underline{H}}_{P\times 1}^{init}, \qquad \text{Eq (8)}$$

where $W_{N\times L}(W_{P\times L}^H W_{P\times L})^{-1} W_{P\times L}^H$ is an N×P matrix that can be pre-computed. The frequency response estimate $\hat{H}_{N\times 1}^{ls}$ can then be obtained with a total of N·P complex operations.

For the two computation methods described above, the minimum number of complex operations needed to obtain $\hat{H}_{N\times 1}^{ls}$ for one OFDM symbol is $N_{op} = \min\{(L\cdot P + 0.5\, N\cdot\log N), N\cdot P\}$. If pilot symbols are transmitted in each OFDM symbol, then the rate of computation is $N_{op}/T_{sym}$ million operations per second (Mops), which is $N_{op}\cdot BW/N$ Mops, where $T_{sym}$ is the duration of one OFDM symbol and is equal to N/BW μsec with no cyclic prefix (described below). The number of complex operations, $N_{op}$, can be very high for an OFDM system with a large number of subbands. As an example, for an OFDM system with an overall bandwidth of BW=6 MHz, N=4096 total subbands, P=512 pilot subbands, and L=512 taps, 420 Mops are needed to compute $\hat{H}_{N\times 1}^{ls}$ using equations (6) and (7). Since equation (6) requires 384 Mops and equation (7) requires 36 Mops, the computation for the least square channel impulse response estimate in equation (6) is significantly more burdensome than the computation for the N-point FFT in equation (7).

Pilot transmission scheme 200 in FIG. 2 does not impose a constraint on the locations of the pilot subbands. The matrix $W_{P\times L}$ contains P rows of the matrix $W_{N\times N}$ corresponding to the P pilot subbands. This results in the need for P complex operations for each of the L entries of the vector $\hat{h}_{L\times 1}^{ls}$.

Figure 3:
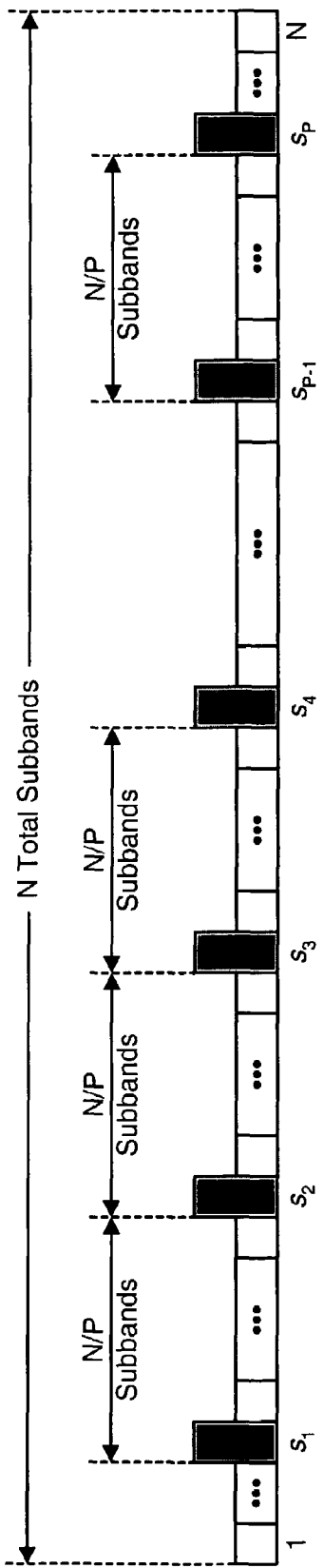
FIG. 3 shows a uniform pilot transmission scheme that can simplify the computation for a least square channel impulse response estimate.

FIG. 3 shows a uniform pilot transmission scheme 300 that can simplify the computation for a least square channel impulse response estimate $\hat{h}_{P\times 1}^{ls}$. For scheme 300, the P pilot subbands are uniformly distributed across the N total subbands such that consecutive pilot subbands are spaced apart by N/P subbands. Furthermore, the number of taps is assumed to be equal to the number of pilot subbands (i.e., L=P). In this case, $W_{P\times P}$ is a P×P DFT matrix, $W_{P\times P}^H W_{P\times P} = I$ where I is the identity matrix, and equation (6) can be simplified as:

$$\hat{h}_{P\times 1}^{ls} = W_{P\times P}^H \hat{H}_{P\times 1}^{init}. \qquad \text{Eq. (9)}$$

Equation (9) indicates that the channel impulse response estimate $\hat{h}_{P\times 1}^{ls}$ can be obtained by performing a P-point IFFT on the initial frequency response estimate $$\hat{\underline{H}}_{P\times 1}^{init}.$$

The vector $\hat{h}_{P\times 1}^{ls}$ can be zero-padded to length N. The zero-padded vector $\hat{h}_{N\times 1}^{ls}$ can then be transformed with an N-point FFT to obtain the vector $\hat{H}_{N\times 1}^{ls}$, as follows:

$$\hat{H}_{N\times 1}^{ls} = W_{N\times N} \hat{h}_{N\times 1}^{ls}. \qquad \text{Eq. (10)}$$

An S×1 vector $\hat{H}_{S\times 1}^{ls}$ for the frequency response estimate for S subbands of interest may also be obtained based on the vector $\hat{h}_{P\times 1}^{ls}$, where in general N≧S≧P. If S is a power of two, then an S-point FFT can perform to obtain $\hat{H}_{S\times 1}^{ls}$.

With pilot transmission scheme 300, the number of complex operations required to obtain $\hat{H}_{N\times 1}^{ls}$ for one OFDM symbol is $N_{op} = 0.5\cdot(P\cdot\log P + N\cdot\log N)$ and the rate of computation is $0.5\cdot BW\cdot(P\cdot\log P + N\cdot\log N)/N$ Mops. For the exemplary OFDM system described above, $\hat{H}_{N\times 1}{}^{ls}$ can be computed with 39.38 Mops using pilot transmission scheme 300, which is much less than the 420 Mops needed for pilot transmission scheme 200.

The reduced-complexity least square channel impulse response estimation described above in equations (9) and (10) relies on two key assumptions:

1. The P pilot subbands are periodic across the N total subbands, and
2. The number of taps is equal to the number of pilot subbands (i.e., L=P).

These two assumptions impose important restrictions/limitations in a practical OFDM system. First, for some OFDM systems, it may not be possible to transmit pilot symbols on P subbands uniformly distributed across the N total subbands. For example, in a spectrally shaped OFDM system, no symbols are transmitted on the guard subbands in order to meet spectral mask requirements. As another example, an OFDM system may not permit pilot/data transmission on certain subbands (e.g., zero or DC subband). As yet another example, pilot may not be available for some subbands due to receiver filter implementation and/or other reasons. For these systems, strict periodicity of the P pilot subbands across the entire N total subbands is typically not possible. Second, the assumption of L=P (which is less serious than the first assumption) can degrade the quality of the final channel frequency response estimate $\hat{H}_{N\times 1}{}^{ls}$. It can be shown that the quality of the channel estimate can degrade by as much as 3 dB from an optimal channel estimate if (1) L is assumed to be equal to P, (2) the pilot symbol energy is the same as the data symbol energy, and (3) time-domain filtering is not performed on $\hat{h}_{P\times 1}{}^{ls}$ or $\hat{H}_{N\times 1}{}^{ls}$ to capture additional energy. This amount of degradation in the channel estimate quality may not be acceptable for some systems.

Various techniques may be used to overcome the two restrictions described above. First, extrapolation and/or interpolation may be used, as necessary, to obtain channel gain estimates for P uniformly spaced subbands based on the received pilot symbols. This allows the channel impulse response estimate $\hat{h}_{P\times 1}{}^{ls}$ to be derived with a P-point IFFT. Second, tap selection may be performed on the P elements of $\hat{h}_{P\times 1}{}^{ls}$ to obtain a higher quality channel estimate. Extrapolation/interpolation and tap selection are described in detail below.

Figure 4:
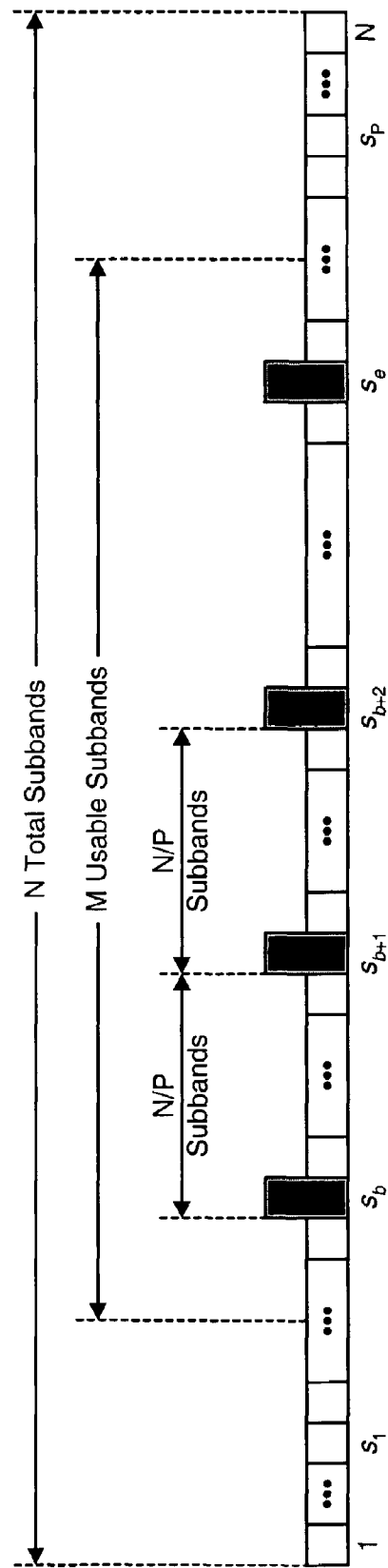
FIG. 4 shows a uniform pilot transmission scheme for a spectrally shaped OFDM system.

FIG. 4 shows a uniform pilot transmission scheme 400 for a spectrally shaped OFDM system. For scheme 400, the P pilot subbands are uniformly distributed across the N total subbands such that consecutive pilot subbands are spaced apart by N/P subbands, similar to scheme 300. However, pilot symbols are transmitted only on pilot subbands that are among the M usable subbands (or simply, the "active pilot subbands"). No pilot symbols are transmitted on pilot subbands that are among the N−M guard subbands (or simply, the "inactive pilot subbands"). The receiver thus obtains pilot symbols for the active pilot subbands and no pilot symbols for the inactive pilot subbands.

Figure 5:
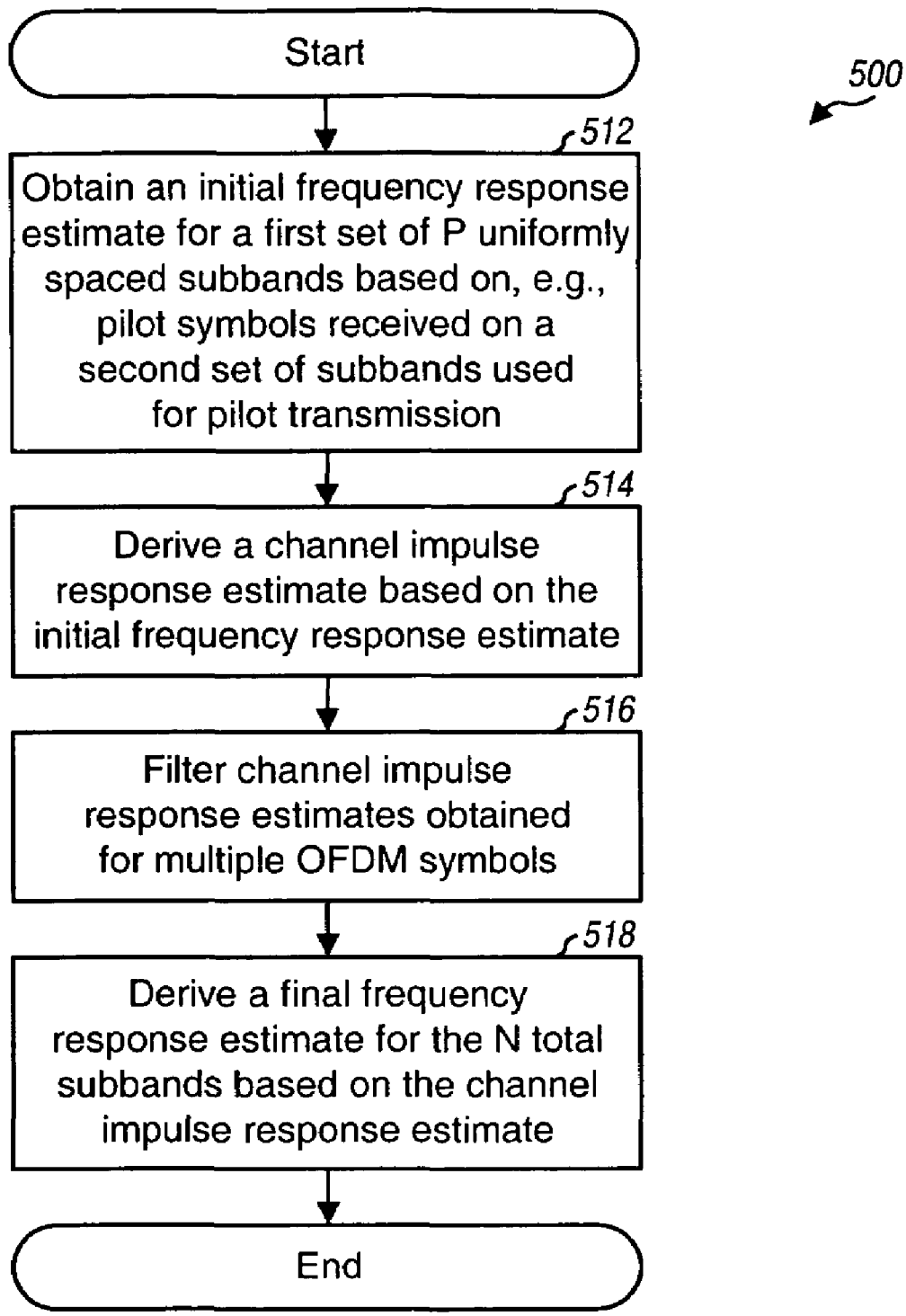
FIGS. 5 and 6 show two processes for obtaining the final frequency response estimate for the wireless channel in a spectrally shaped OFDM system.

FIG. 5 shows a process 500 for obtaining the frequency response estimate $\hat{H}_{N\times 1}{}^{ls}$ for the wireless channel in the spectrally shaped OFDM system. An initial frequency response estimate for a first set of P uniformly spaced subbands is obtained based on, for example, pilot symbols received on a second set of subbands used for pilot transmission (block 512). The first set includes at least one subband not included in the second set (e.g., pilot subbands among the guard subbands). An impulse response estimate for the wireless channel is next derived based on the initial frequency response estimate (block 514). Channel impulse response estimates for multiple OFDM symbols may be filtered to obtain a higher quality channel estimate (block 516). A final frequency response estimate for the wireless channel is then derived based on the (filtered or unfiltered) channel impulse response estimate (block 518). Filtering may also be performed on the initial or final frequency response estimate (instead of the channel impulse response estimate) to obtain higher quality channel estimate.

Figure 6:
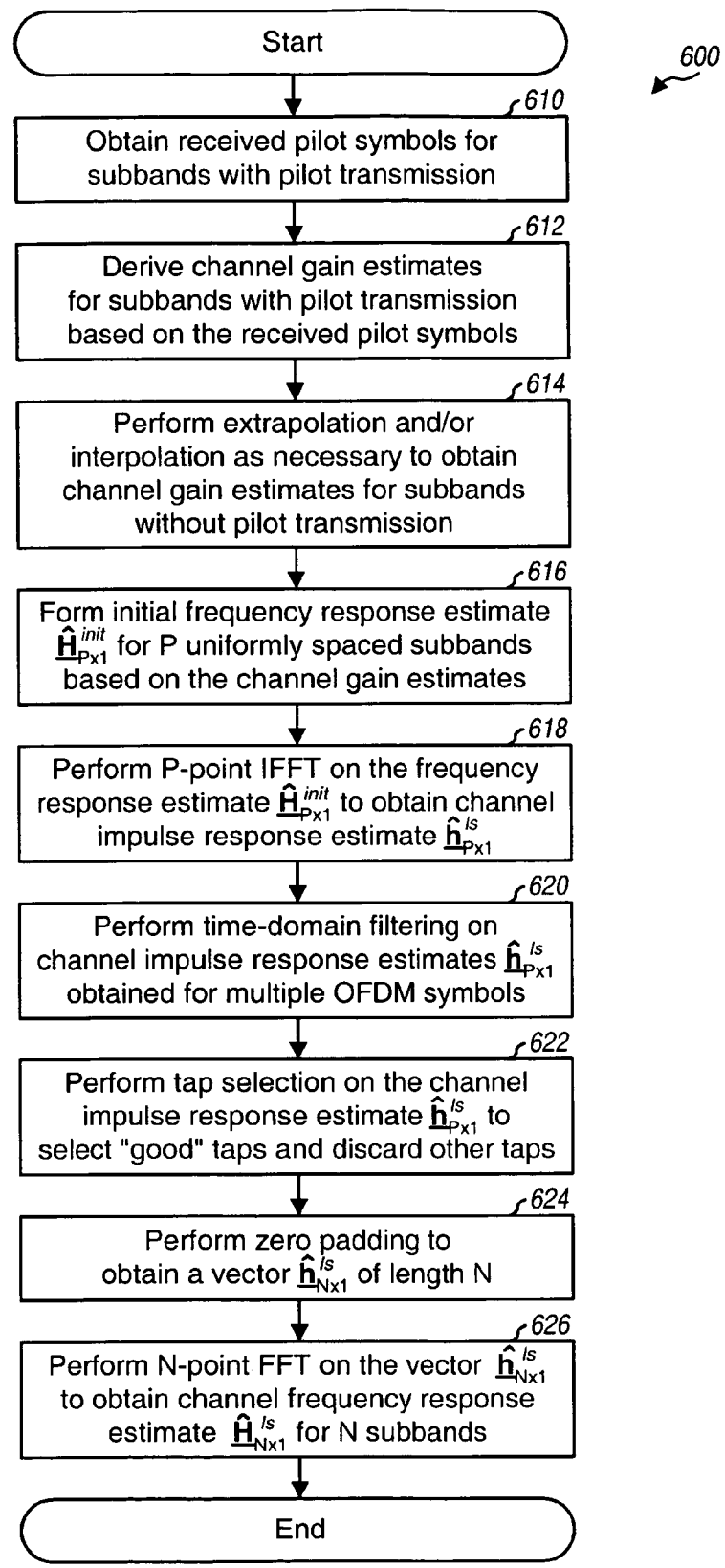

FIG. 6 shows a specific process 600 for obtaining the frequency response estimate $\hat{H}_{N\times 1}{}^{ls}$ in the spectrally shaped OFDM system. Initially, received pilot symbols are obtained for $P_{act}$ active pilot subbands with pilot transmission (block 610). Channel gain estimates $\hat{h}(s_i)$ for the $P_{act}$ active pilot subbands are then derived based on the received pilot symbols (block 612). The output of block 612 is a $P_{act} \times 1$ vector $$\hat{H}_{P_{act}\times 1}^{init}$$

for the initial frequency response estimate for the $P_{act}$ active pilot subbands. Extrapolation and/or interpolation are performed as necessary to obtain channel gain estimates for $P_{ext}$ subbands without pilot transmission, as described below (block 614). The output of block 614 is a $P_{ext} \times 1$ vector $$\hat{H}_{P\times 1}^{init}$$

for the initial frequency response estimate for the $P_{ext}$ subbands without pilot transmission. The P×1 vector $$\hat{H}_{P_{act}\times 1}^{init} \text{ and } \hat{H}_{P_{ext}\times 1}^{init},$$

for the initial frequency response estimate for P uniformly spaced subbands is then formed based on the channel gain estimates from the vectors $$\hat{H}_{P\times 1}^{init}$$

e.g., $$\hat{H}_{P\times 1}^{init} = [\hat{H}_{P_{act}\times 1}^{init} \; \hat{H}_{P_{ext}\times 1}^{init}]^T$$

(block 616). The channel gain estimate for each of the P subbands may be derived based on either a received pilot symbol or extrapolation/interpolation.

A P-point IFFT is then performed on the vector $$\hat{H}_{P\times 1}^{init}$$

to obtain the P×1 vector $\hat{h}_{P\times 1}{}^{ls}$ for the least square channel impulse response estimate, as shown in equation (9) (block 618). Time-domain filtering may be performed on the channel impulse response estimates $\hat{h}_{P\times 1}{}^{ls}$ for multiple OFDM symbols to obtain a higher quality channel estimate (block 620). The time-domain filtering may be omitted or may be performed on frequency response estimates instead of impulse response estimates. The (filtered or unfiltered) vector $\hat{h}_{P \times 1}^{ls}$ includes P entries for L taps, where L is typically less than P. The vector $\hat{h}_{P \times 1}^{ls}$ is then processed to select "good" taps and discard or zero out remaining taps, as described below (block 622). Zero padding is also performed to obtain the N×1 vector $\hat{h}_{N \times 1}^{ls}$ for the channel impulse response estimate (block 624). An N-point FFT is then performed on the vector $\hat{h}_{N \times 1}^{ls}$ to obtain the vector $\hat{H}_{N \times 1}^{ls}$ for the final frequency response estimate for the N total subbands (block 626).

Extrapolation/Interpolation

For block 614 in FIG. 6, extrapolation can be used to obtain channel gain estimates for inactive pilot subbands that are located among the guard subbands. For a function y=f(x), where a set of y values is available for a set of x values within a known range, extrapolation can be used to estimate a y value for an x value outside of the known range. For channel estimation, x corresponds to pilot subband and y corresponds to channel gain estimate. Extrapolation can be performed in various manners.

In one extrapolation scheme, the channel gain estimate for each inactive pilot subband is set equal to the channel gain estimate for the nearest active pilot subband, as follows:

$$\hat{H}(s_i) = \begin{cases} \hat{H}(s_b) & \text{for } s_i < s_b \\ \hat{H}(s_e) & \text{for } s_i > s_e \end{cases}, \quad \text{Eq (11)}$$

where $\hat{H}(s_i)$ is the channel gain estimate for subband $s_i$, $s_b$ is the first active pilot subband, and $s_e$ is the last active pilot subband, as shown in FIG. 4.

In another extrapolation scheme, the channel gain estimate for each inactive pilot subband is obtained based on a weighted sum of the channel gain estimates for the active pilot subbands. If the number of taps L is less than or equal to the number of active pilot subbands (i.e., $L \leq P_{act}$), then (in the absence of noise) the wireless channel can be completely characterized by the channel gain estimates for the active pilot subbands. For the extrapolation, each inactive pilot subband is associated with a respective set of extrapolation coefficients, one coefficient for each active pilot subband, where each coefficient may be a zero or non-zero value. The extrapolation/interpolation for the inactive pilot subbands may be expressed in matrix form, as follows:

$$\hat{H}_{P_{ext} \times 1}^{init} = \underline{C}_{P_{ext} \times P_{act}} \hat{H}_{P_{act} \times 1}^{init}, \quad \text{Eq (12)}$$

where $C_{P_{ext} \times P_{act}}$ is a $P_{ext} \times P_{act}$ matrix of extrapolation coefficients.

The number of complex operations required for extrapolation in equation (12) is $P_{ext} \cdot P_{act}$. The number of inactive pilot subbands is $$P_{ext} = \left\lceil \frac{P_{act} \cdot G}{N} \right\rceil,$$

while G is the number of guard subbands and "⌈x⌉" is a ceiling operator that provides the next higher integer for x. The number of inactive pilot subbands in the system is typically small if the number of guard subbands is small. For example, the OFDM system described above may have only 10 inactive pilot subbands (i.e., $P_{ext}$=10) out of 512 pilot subbands (i.e., P=512) if there are 80 guard subbands (i.e., G=80). In this case, the computation required for extrapolation does not greatly increase computational complexity. The computational complexity can also be reduced explicitly by restricting the extrapolation to use a subset of the active pilots.

The extrapolation coefficients can be fixed and determined offline (i.e., pre-computed) based on a criterion such as least-squares, minimum mean square error (MMSE), and so on. For least-squares extrapolation, a coefficient matrix $C_{P_{ext} \times P_{act}}^{ls}$ may be defined as follows:

$$C_{P_{ext} \times P_{act}}^{ls} = W_{P_{ext} \times L}(W_{P_{act} \times L}^H W_{P_{act} \times L})^{-1} W_{P_{act} \times L}^H, \quad \text{Eq. (13)}$$

where $W_{P_{ext} \times L}$ is a $P_{act} \times L$ sub-matrix of $W_{N \times N}$. In a practical system, the matrix $W_{P_{act} \times L}^H W_{P_{act} \times L}$ may be "ill-conditioned", which means that the computation of the inverse of this matrix may face numerical stability issues. In this case, a correction term may be used to get around the ill-conditioning problem, and a modified least-squares extrapolation matrix $$\underline{C}_{P_{est} \times P_{act}}^{mls}$$

may be defined as follows:

$$C_{P_{ext} \times P_{act}}^{mls} = W_{P_{ext} \times L}(W_{P_{act} \times L}^H + \delta I)^{-1} W_{P_{act} \times L}^H, \quad \text{Eq. (14)}$$

where δ is a small correction factor.

For MMSE extrapolation, a coefficient matrix $$\underline{C}_{P_{est} \times P_{act}}^{mmse}$$

may be defined as follows:

$$\underline{C}_{P_{est} \times P_{act}}^{mmse} = \eta \gamma \underline{W}_{P_{ext} \times L} \underline{W}_{P_{act} \times L}^H (\gamma \underline{W}_{P_{act} \times L} \underline{W}_{P_{act} \times L}^H + I)^{-1}, \quad \text{Eq (15)}$$

where γ the signal-to-noise ratio (SNR) of the received pilot symbols; and

η is a factor used to derive an unbiased estimate.

In the absence of SNR information, γ may be considered as a parameter that can be selected to optimize performance. The factor η is a scalar quantity may also be used to optimize performance. The vector $$\hat{H}_{P_{est} \times 1}^{init}$$

obtained with $$\underline{C}_{P_{est} \times P_{act}}^{mmse}$$

is an MMSE estimate of the channel under the assumption that the taps in the time-domain are uncorrelated and are of equal energy. Equation (15) assumes that the autocovariance matrix of the noise vector $n_{P_{act} \times 1}^P$ for the $P_{act}$ active pilot subband is the identity matrix. Equation (15) may be modified to account for this autocovariance matrix if it is known by the receiver.

In yet another extrapolation scheme, the channel gain estimate for each inactive pilot subband is set equal to zero, i.e., $\hat{H}(s_i)$=0 for $s_i < s_b$ and $s_i > s_e$. The extrapolation may also be performed in other manners, and this is within the scope of the invention. For example, functional extrapolation techniques such as linear and quadratic extrapolation may be used. Non-linear extrapolation techniques may also be used, which fall within the general framework of equation (12).

A pilot transmission scheme may not distribute the active pilot subbands uniformly across the M usable subbands. In this case, interpolation may also be used to obtain channel gain estimates for uniformly spaced subbands within the M usable subbands. The interpolation may be performed in various manners, similar to that described above for extrapolation. In general, extrapolation and/or interpolation may be performed as necessary based on the available received pilot symbols to obtain channel gain estimates for P subbands uniformly spaced across the N total subbands.

Tap Selection

For block 622 in FIG. 6, tap selection is performed on the vector $\hat{h}_{P \times 1}^{ls}$ to select good taps for the channel impulse response estimate. The tap selection may be performed in various manners.

In one tap selection scheme, the channel impulse response estimate $\hat{h}_{P \times 1}^{ls}$ is truncated to L values for the L taps of the wireless channel. The vector $\hat{h}_{P \times 1}^{ls}$ contains P elements, where P≧L. For this deterministic tap selection scheme, the first L elements of $\hat{h}_{P \times 1}^{ls}$ are considered as good taps and retained, and the last P−L elements are replaced with zeros. When L<P, the least squares channel impulse response estimate with L taps can be obtained (without loss in performance) by assuming a channel with P taps, performing a P-point IFFT, and truncating the last P−L taps. This has some benefits in certain situations. For example, if L<P/2, then the least squares channel impulse response estimate can be derived with the computational benefits of the FFT and not computing the last P/2 taps.

In another tap selection scheme, the elements of $\hat{h}_{P \times 1}^{ls}$ with low energy are replaced with zeros. These elements of $\hat{h}_{P \times 1}^{ls}$ correspond to taps with low energy, where the low energy is likely due to noise rather than signal energy. A threshold is used to determine whether a given element/tap has sufficient energy and should be retained or should be zeroed out. This process is referred to as "thresholding".

The threshold can be computed based on various factors and in various manners. The threshold can be a relative value (i.e., dependent on the measured channel response) or an absolute value (i.e., not dependent on the measured channel response). A relative threshold can be computed based on the (e.g., total or average) energy of the channel impulse response estimate. The use of the relative threshold ensures that (1) the thresholding is not dependent on variations in the received energy and (2) the elements/taps that are present but with low signal energy are not zeroed out. An absolute threshold can be computed based on the noise variance/noise floor at the receiver, the lowest energy expected for the received pilot symbols, and so on. The use of the absolute threshold forces the elements of $\hat{h}_{P \times 1}^{ls}$ to meet some minimum value in order to be retained. The threshold can also be computed based on a combination of factors used for relative and absolute thresholds. For example, the threshold can be computed based on the energy of the channel impulse response estimate and further constrained to be equal to or greater than a predetermined minimum value.

The thresholding can be performed in various manners. In one thresholding scheme, the thresholding is performed after the truncation and may be expressed as:

$$\hat{h}(n) = \begin{cases} 0 & \text{for } |\hat{h}(n)|^2 < \alpha \cdot \|\hat{h}_{P \times 1}^{ls}\|^2 / L \\ \hat{h}(n) & \text{otherwise} \end{cases}, \text{ for } n = 0 \ldots L-1 \quad \text{Eq (16)}$$

where $\hat{h}_{P \times 1}^{ls} = [\hat{h}(0) \ \hat{h}(1) \ \ldots \ \hat{h}(P-1)]^T$, where the last P−L elements are replaced with zeros by the truncation;

$|\hat{h}(n)|^2$ is the energy of the n-th tap;

$\|\hat{h}_{P \times 1}^{ls}\|^2$ is the energy of the channel impulse response estimate for the L taps; and $\alpha \cdot \|\hat{h}_{P \times 1}^{ls}\|^2 / L$ is the threshold used to zero out low energy elements/taps.

$\|x\|^2$ is the norm of vector x and is equal to the sum of the squares of all of the elements in the vector x.

In equation (16), the threshold is defined based on the average energy of the L taps. The coefficient α is selected based on a trade off between noise suppression and signal deletion. A higher value for α provides more noise suppression but also increases the likelihood of a low signal energy element/tap being zeroed out. The coefficient α can be a value within a range of 0 to 1 (e.g., α=0.1). The threshold can also be defined based on the total energy (instead of the average energy) for the channel impulse response estimate $\hat{h}_{P \times 1}^{ls}$. The threshold may be fixed or adapted based on (1) the particular coding and modulation scheme or rate of the data stream being demodulated (2) a bit error rate (BER), packet error rate (PER), block error rate (BLER), or some other error rate performance requirement, and/or (3) some other parameters and considerations.

In another thresholding scheme, the thresholding is performed on all P elements of $\hat{h}_{P \times 1}^{ls}$ (i.e., without truncation) using a single threshold, similar to that shown in equation (16). In yet another thresholding scheme, the thresholding is performed on all P elements of $\hat{h}_{P \times 1}^{ls}$ using multiple thresholds. For example, a first threshold may be used for the first L elements of $\hat{h}_{P \times 1}^{ls}$, and a second threshold may be used for the last P−L elements of $\hat{h}_{P \times 1}^{ls}$. The second threshold may be set lower than the first threshold. In yet another thresholding scheme, the thresholding is performed on only the last P−L elements of $\hat{h}_{P \times 1}^{ls}$ and not on the first L elements. The thresholding may be performed in other manners, and this is within the scope of the invention.

Thresholding is well suited for a wireless channel that is "sparse", such as a wireless channel in a macro-cellular broadcast system. A sparse wireless channel has much of the channel energy concentrated in few taps. Each tap corresponds to a resolvable signal path with different time delay. A sparse channel includes few signal paths even though the delay spread (i.e., time difference) between these signal paths may be large. The taps corresponding to weak or non-existing signal paths can be zeroed out.

For block 518 in FIG. 5 and block 620 in FIG. 6, the channel impulse response estimate may be filtered in the time domain using a lowpass filter such as a finite impulse response (FIR) filter, an infinite impulse response (IIR) filter, or some other type of filter. The lowpass filter may be a causal filter (which performs filtering on past and current samples) or a non-causal filter (which performs filtering on past, current, and future samples obtained by buffering). The characteristics (e.g., bandwidth) of the filter may be selected based on the characteristics of the wireless channel. Time-domain filtering may be performed separately for each tap of the channel impulse response estimate across multiple OFDM symbols. The same or different filters may be used for the taps of the channel impulse response estimate. The coefficients for each such filter may be fixed or may be adjustable based on detected channel conditions. Performing the filtering in the time domain has an advantage in that the pilot subbands can be staggered in the frequency domain (i.e., different sets of pilot subbands may be used for different OFDM symbols). The staggering of pilot subbands is useful when the channel has an excess delay spread (i.e., the channel impulse response has a length greater than P taps). A channel impulse response estimate with more than P taps can be obtained with the additional and different pilot subbands provided by staggering. The filtering may also be performed on the initial or final frequency response estimates.

OFDM System

Figure 7:
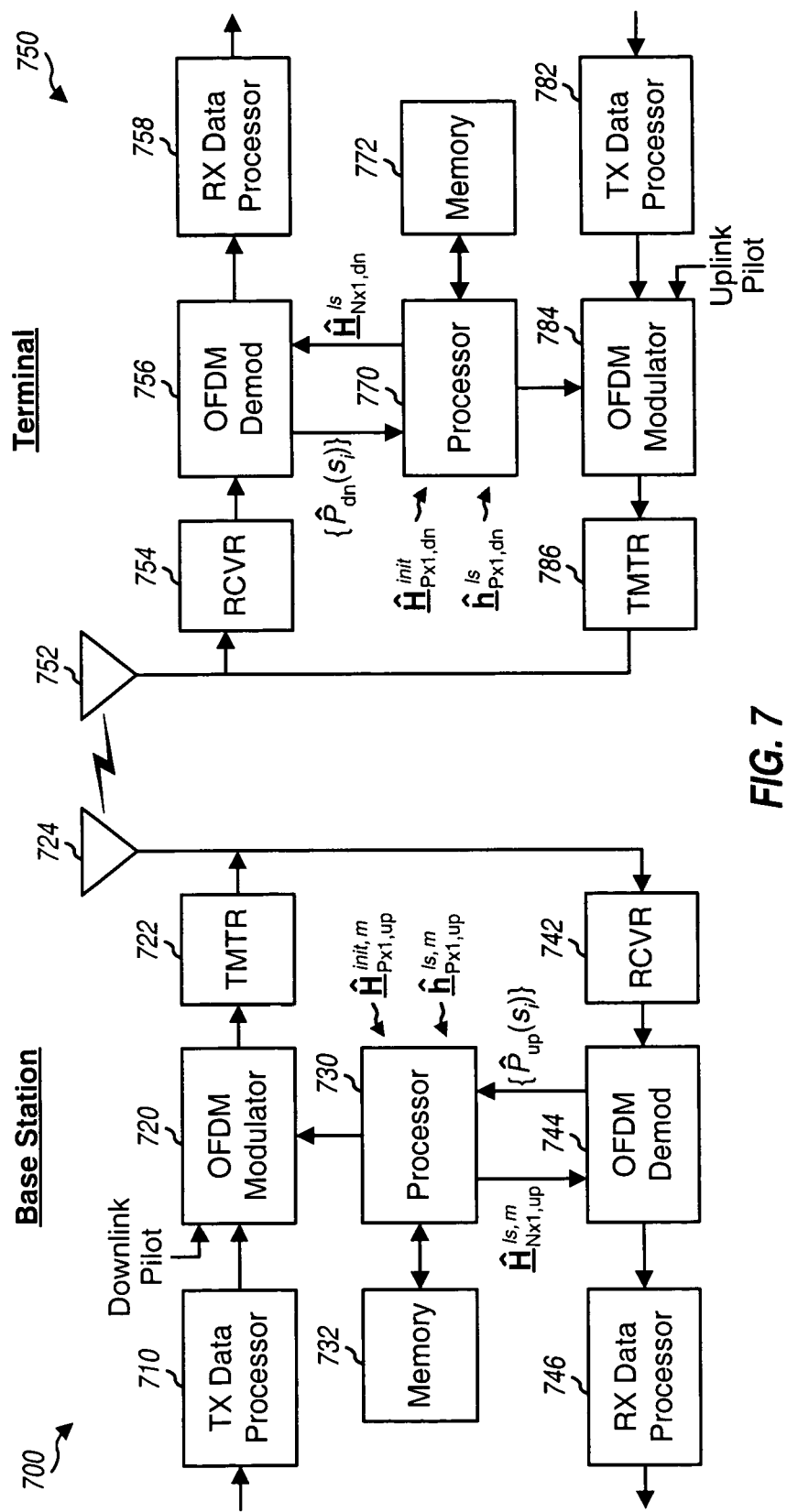
FIG. 7 shows an access point and a terminal in the OFDM system.

FIG. 7 shows a block diagram of an access point 700 and a terminal 750 in a spectrally shaped OFDM system. On the downlink, at access point 700, a transmit (TX) data processor 710 receives, formats, codes, interleaves, and modulates (i.e., symbol maps) traffic data and provides modulation symbols (or simply, "data symbols"). An OFDM modulator 720 receives and processes the data symbols and pilot symbols and provides a stream of OFDM symbols. OFDM modulator 720 multiplexes data and pilot symbols on the proper subbands, provides a signal value of zero for each unused subband, and obtains a set of N transmit symbols for the N subbands for each OFDM symbol period. Each transmit symbol may be a data symbol, a pilot symbol, or a signal value of zero. The pilot symbols may be sent on active pilot subbands, as shown in FIG. 4. The pilot symbols may be sent continuously in each OFDM symbol period. Alternatively, the pilot symbols may be time division multiplexed (TDM) with the data symbols on the same subband.

OFDM modulator 720 further transforms each set of N transmit symbols to the time domain using an N-point IFFT to obtain a "transformed" symbol that contains N time-domain chips. OFDM modulator 720 typically repeats a portion of each transformed symbol to obtain a corresponding OFDM symbol. The repeated portion is known as a cyclic prefix and is used to combat delay spread in the wireless channel.

A transmitter unit (TMTR) 722 receives and converts the stream of OFDM symbols into one or more analog signals and further conditions (e.g., amplifies, filters, and frequency upconverts) the analog signals to generate a downlink signal suitable for transmission over the wireless channel. The downlink signal is then transmitted via an antenna 724 to the terminals.

At terminal 750, an antenna 752 receives the downlink signal and provides a received signal to a receiver unit (RCVR) 754. Receiver unit 754 conditions (e.g., filters, amplifies, and frequency downconverts) the received signal and digitizes the conditioned signal to obtain samples. An OFDM demodulator 756 removes the cyclic prefix appended to each OFDM symbol, transforms each received transformed symbol to the frequency domain using an N-point FFT, obtains N received symbols for the N subbands for each OFDM symbol period, and provides received pilot symbols $\{\hat{P}_{dn}(s_i)\}$ to a processor 770 for channel estimation. OFDM demodulator 756 further receives a frequency response estimate $\hat{H}_{N\times1,dn}$ for the downlink from processor 770, performs data demodulation on the received data symbols to obtain data symbol estimates (which are estimates of the transmitted data symbols), and provides the data symbol estimates to an RX data processor 758. RX data processor 758 demodulates (i.e., symbol demaps), deinterleaves, and decodes the data symbol estimates to recover the transmitted traffic data. The processing by OFDM demodulator 756 and RX data processor 758 is complementary to the processing by OFDM modulator 720 and TX data processor 710, respectively, at access point 700.

Processor 770 obtains the received pilot symbols for the active pilot subbands and performs channel estimation as shown in FIGS. 5 and 6. Processor 770 performs extrapolation and/or interpolation as necessary to obtain channel gain estimates for $P_{dn}$ uniformly spaced subbands (where $P_{dn}$ is the number of pilot subbands for the downlink), derives a least square impulse response estimate $\hat{h}_{P\times1,dn}^{ls}$ for the downlink, performs tap selection for the P elements/taps of $\hat{h}_{P\times1,dn}^{ls}$, and derives the final frequency response estimate $\hat{H}_{N\times1,dn}^{ls}$ for the N subbands for the downlink.

On the uplink, a TX data processor 782 processes traffic data and provides data symbols. An OFDM modulator 784 receives and multiplexes the data symbols with pilot symbols, performs OFDM modulation, and provides a stream of OFDM symbols. The pilot symbols may be transmitted on $P_{up}$ subbands that have been assigned to terminal 750 for pilot transmission, where the number of pilot subbands ($P_{up}$) for the uplink may be the same or different from the number of pilot subbands ($P_{dn}$) for the downlink. The pilot symbols may also be multiplexed with the data symbols using TDM. A transmitter unit 786 then receives and processes the stream of OFDM symbols to generate an uplink signal, which is transmitted via an antenna 752 to the access point.

At access point 700, the uplink signal from terminal 150 is received by antenna 724 and processed by a receiver unit 742 to obtain samples. An OFDM demodulator 744 then processes the samples and provides received pilot symbols $\{\hat{P}_{up}(s_i)\}$ and data symbol estimates for the uplink. An RX data processor 746 processes the data symbol estimates to recover the traffic data transmitted by terminal 750.

Processor 730 performs channel estimation for each active terminal transmitting on the uplink as shown in FIGS. 5 and 6. Multiple terminals may transmit pilot concurrently on the uplink on their respective assigned sets of pilot subbands, where the pilot subband sets may be interlaced. For each terminal m, processor 730 performs extrapolation and/or interpolation as needed for the terminal, obtains an initial frequency response estimate $$\hat{H}_{P\times1,up}^{init,m}$$

for the uplink for the terminal, derives at least square channel impulse response estimate $$\hat{h}_{P\times1,up}^{ls,m}$$

for the terminal based on $$\hat{H}_{P\times1,up}^{init,m},$$

performs tap selection, and further obtains a final frequency response estimate $$\hat{H}_{N\times1,up}^{ls,m}$$

for the terminal. The frequency response estimate $$\hat{H}_{N\times 1,up}^{ls,m}$$

for each terminal is provided to OFDM demodulator 744 and used for data demodulation for that terminal.

Processors 730 and 770 direct the operation at access point 700 and terminal 750, respectively. Memory units 732 and 772 store program codes and data used by processors 730 and 770, respectively. Processors 730 and 770 also perform the computation described above to derive frequency and impulse response estimates for the uplink and downlink, respectively.

For a multiple-access OFDM system (e.g., an orthogonal frequency division multiple-access (OFDMA) system), multiple terminals may transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal.

The channel estimation techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the channel estimation techniques may be implemented with modules (e.g., procedures, functions, and so on) that perform the functions described herein. The software codes may be stored in a memory unit (e.g., memory units 732 and 772 in FIG. 7) and executed by a processor (e.g., processors 730 and 770). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of efficiently estimating a frequency response of a wireless channel in a wireless OFDM communication system in which only M subbands centered among N total subbands are used for data/pilot transmission with N−M subbands at either end comprising inactive subbands, the method comprising:
    (a) obtaining an initial frequency response estimate for subbands in a first set of uniformly spaced apart by N/P subbands based on channel gain estimates for a second set of subbands within the centered M subbands, where P is an integer greater than one and N is total subbands, and wherein the first set includes at least one subband not included in the second set;
    (b) deriving a time-domain channel impulse response estimate for the wireless channel based on the initial frequency response estimate; and
    (c) deriving a final frequency response estimate for the wireless channel based on the channel impulse response estimate.

2. The method of claim 1, further comprising: deriving the channel gain estimates for the second set of subbands based on pilot symbols received on the subbands in the second set.

3. The method of claim 1, wherein the deriving the time-domain channel impulse response estimate includes performing a P-point inverse fast Fourier transform (IFFT) on the initial frequency response estimate to obtain the channel impulse response estimate.

4. The method of claim 1, wherein the deriving a final frequency response estimate includes zero padding the channel impulse response estimate to length S, where S is an integer greater than or equal to P and is a power of two, and
    performing an S-point fast Fourier transform (FFT) on the zero-padded channel impulse response estimate to obtain the final frequency response estimate.

5. The method of claim 4, wherein S is equal to total number of subbands in the system.

6. The method of claim 1, further comprising:
    performing extrapolation based on the received pilot symbols to obtain at least one channel gain estimate for the at least one subband not included in the second set, and wherein the initial frequency response estimate includes the at least one channel gain estimate.

7. The method of claim 1, further comprising:
    performing interpolation based on the received pilot symbols to obtain at least one channel gain estimate for the at least one subband not included in the second set, and wherein the initial frequency response estimate includes the at least one channel gain estimate.

8. The method of claim 1, further comprising: obtaining a channel gain estimate for each of the at least one subband based on a channel gain estimate for a nearest subband.

9. The method of claim 1, further comprising: obtaining a channel gain estimate for each of the at least one subband based on a weighted sum of the channel gain estimates for the second set of subbands.

10. The method of claim 1, wherein the channel impulse response estimate includes P taps, and wherein selected ones of the P taps are set to zero.

11. The method of claim 1, further comprising: filtering the channel impulse response estimate, and wherein the final frequency response estimate is derived based on the filtered channel impulse response estimate.

12. The method of claim 1, further comprising: filtering the final frequency response estimate to obtain a higher quality frequency response estimate for the wireless channel.

13. The method of claim 1, wherein the wireless communication system is an orthogonal frequency division multiplexing (OFDM) communication system.

14. An apparatus in a wireless communication system for efficiently estimating a frequency response of a wireless channel in a wireless OFDM communication system in which only M subbands centered among N total subbands are used for data/pilot transmission with N−M subbands at either end comprising inactive subbands, comprising:
- a demodulator operative to provide received symbols; and
- a processor operative to obtain an initial frequency response estimate for subbands in a first set of uniformly spaced apart by N/P subbands based on channel gain estimates for a second set of subbands within the centered M subbands derived from the received symbols, where P is an integer greater than one and N is total subbands, wherein the first set includes at least one subband not included in the second set,
  derive a time-domain channel impulse response estimate for the wireless channel based on the initial frequency response estimate, and
  derive a final frequency response estimate for the wireless channel based on the channel impulse response estimate.

15. The apparatus of claim 14, wherein the processor is further operative to perform extrapolation or interpolation based on the received pilot symbols to obtain at least one channel gain estimate for the at least one subband not included in the second set, and wherein the initial frequency response estimate includes the at least one channel gain estimate.

16. The apparatus of claim 14, wherein the processor is further operative to set selected ones of P taps for the channel impulse response estimate to zero.

17. The apparatus of claim 14, wherein the processor is further operative to filter the channel impulse response estimate, and wherein the final frequency response estimate is derived based on the filtered channel impulse response estimate.

18. An apparatus in a wireless communication system for efficiently estimating a frequency response of a wireless channel in a wireless OFDM communication system in which only M subbands centered among N total subbands are used for data/pilot transmission with N−M subbands at either end comprising inactive subbands, comprising:
  means for obtaining an initial frequency response estimate for subbands in a first set of uniformly spaced apart by N/P subbands based on channel gain estimates for a second set of subbands within the centered M subbands, where P is an integer greater than one and N is total subbands, and wherein the first set includes at least one subband not included in the second set;
  means for deriving a time-domain channel impulse response estimate for the wireless channel based on the initial frequency response estimate; and means for deriving a final frequency response estimate for the wireless channel based on the channel impulse response estimate.

19. The apparatus of claim 18, further comprising:
  means for performing extrapolation based on the received pilot symbols to obtain at least one channel gain estimate for the at least one subband not included in the second set, and wherein the initial frequency response estimate includes the at least one channel gain estimate.

20. The apparatus of claim 18, further comprising: means for setting selected ones of P taps for the channel impulse response estimate to zero.

21. The apparatus of claim 18, further comprising: means for filtering the channel impulse response estimate, and wherein the final frequency response estimate is derived based on the filtered channel impulse response estimate.

22. A method of efficiently estimating a frequency response of a wireless channel in a wireless OFDM communication system in which only M subbands centered among N total subbands are used for data/pilot transmission with N−M subbands at either end comprising inactive subbands, comprising:
  a) obtaining an initial frequency response estimate for subbands in a first set of uniformly spaced apart by N/P subbands based on channel gain estimates for a second set of subbands within the centered M subbands, where P is an integer greater than one and N is total subbands, and wherein the first set includes at least one subband not included in the second set;
  b) deriving a time-domain channel impulse response estimate for the wireless channel based on the initial frequency response estimate;
  c) filtering the channel impulse response estimate over a plurality of symbol periods; and
  d) deriving a final frequency response estimate for the wireless channel based on the filtered channel impulse response estimate.

23. The method of claim 22, wherein the filtering of the channel impulse response estimate is performed separately for each of L taps, where L is an integer greater than one and less than P.

24. The method of claim 22, wherein the filtering is based on a finite impulse response (FIR) filter or an infinite impulse response (IIR) filter.

25. The method of claim 22, wherein the filtering is based on a causal filter.

26. The method of claim 22, wherein the filtering is based on a non-causal filter.

27. A method of efficiently estimating a frequency response of a wireless channel in an orthogonal frequency division multiplexing (OFDM) communication system in which only M subbands centered among N total subbands are used for data/pilot transmission with N−M subbands at either end comprising inactive subbands, the method comprising:
  obtaining an initial frequency response estimate for subbands in a first set of uniformly spaced apart by N/P subbands based on channel gain estimates derived from pilot symbols received on a second set of subbands within the centered M subbands, where P is an integer greater than one and N is total subbands, and wherein the first set includes at least one subband not included in the second set;
  performing a P-point inverse fast Fourier transform (IFFT) on the initial frequency response estimate to obtain a time-domain channel impulse response estimate;
  zero padding the channel impulse response estimate to length N, where N is an integer greater than P and is a power of two; and
  performing an N-point fast Fourier transform (FFT) on the zero-padded channel impulse response estimate to obtain a final frequency response estimate for the wireless channel.

28. The method of claim 27, further comprising:
  performing extrapolation based on the received pilot symbols to obtain at least one channel gain estimate for the at least one subband not included in the second set, and wherein the initial frequency response estimate includes the at least one channel gain estimate.

29. The method of claim 27, further comprising:
  selecting and setting P−L of the P taps to zero, wherein P and L are integers and L less than P.

30. A processor readable memory for storing instructions operable to:
  efficiently derive an initial frequency response estimate of a wireless channel in a wireless OFDM communication system, in which only M subbands centered among N total subbands are used for data/pilot transmission with N−M subbands at either end comprising inactive subbands for a first set of uniformly spaced apart by N/P subbands in an orthogonal frequency division multiplexing (OFDM) communication system based on channel gain estimates for a second set of subbands within the centered M subbands, where P is an integer greater than one and N is total subbands, and wherein the first set includes at least one subband not included in the second set;

perform a P-point inverse fast Fourier transform (IFFT) on the initial frequency response estimate to obtain a time-domain channel impulse response estimate;

zero pad the channel impulse response estimate to length N, where N is an integer greater than P and is a power of two; and perform an N-point fast Fourier transform (FFT) on the zero-padded channel impulse response estimate to obtain a final frequency response estimate for a wireless channel in the system.

31. The method of claim 1, further comprising:
obtaining a channel gain estimate for each of the at least one subband based on a weighted sum of the channel gain estimates for the second set of subbands, wherein the weighted sum is determined based on a least-squares or a minimum mean square error (MMSE) criterion.

32. A non-transitory computer readable medium having computer executable instructions stored thereon, which when executed by a machine cause the machine to perform operations comprising:
(a) obtaining an initial frequency response estimate for subbands in a first set of uniformly spaced apart by N/P subbands based on channel gain estimates for a second set of subbands within the centered M subbands, where P is an integer greater than one and N is total subbands, and wherein the first set includes at least one subband not included in the second set;
(b) deriving a time-domain channel impulse response estimate for the wireless channel based on the initial frequency response estimate; and
(c) deriving a final frequency response estimate for the wireless channel based on the channel impulse response estimate.

33. The non-transitory computer readable medium of claim 32, having further computer executable instructions stored thereon, which when executed by the machine cause the machine to perform further operations comprising:
deriving the channel gain estimates for the second set of subbands based on pilot symbols received on the subbands in the second set.

34. The non-transitory computer readable medium of claim 32, wherein the deriving the time-domain channel impulse response estimate includes performing a P-point inverse fast Fourier transform (IFFT) on the initial frequency response estimate to obtain the channel impulse response estimate.

35. The non-transitory computer readable medium of claim 32, wherein the deriving a final frequency response estimate includes zero padding the channel impulse response estimate to length S, where S is an integer greater than or equal to P and is a power of two, and
performing an S-point fast Fourier transform (FFT) on the zero-padded channel impulse response estimate to obtain the final frequency response estimate.

36. The non-transitory computer readable medium of claim 35, wherein S is equal to total number of subbands in the system.

37. The non-transitory computer readable medium of claim 32, having further computer executable instructions stored thereon, which when executed by the machine cause the machine to perform further operations comprising:
performing extrapolation based on the received pilot symbols to obtain at least one channel gain estimate for the at least one subband not included in the second set, and wherein the initial frequency response estimate includes the at least one channel gain estimate.

38. The non-transitory computer readable medium of claim 32, having further computer executable instructions stored thereon, which when executed by the machine cause the machine to perform further operations comprising:
performing interpolation based on the received pilot symbols to obtain at least one channel gain estimate for the at least one subband not included in the second set, and wherein the initial frequency response estimate includes the at least one channel gain estimate.

39. The non-transitory computer readable medium of claim 32, having further computer executable instructions stored thereon, which when executed by the machine cause the machine to perform further operations comprising:
obtaining a channel gain estimate for each of the at least one subband based on a channel gain estimate for a nearest subband.

40. The non-transitory computer readable medium of claim 32, having further computer executable instructions stored thereon, which when executed by the machine cause the machine to perform further operations comprising:
obtaining a channel gain estimate for each of the at least one subband based on a weighted sum of the channel gain estimates for the second set of subbands.

41. The non-transitory computer readable medium of claim 32, wherein the channel impulse response estimate includes P taps, and wherein selected ones of the P taps are set to zero.

42. The non-transitory computer readable medium of claim 32, having further computer executable instructions stored thereon, which when executed by the machine cause the machine to perform further operations comprising:
filtering the channel impulse response estimate, and wherein the final frequency response estimate is derived based on the filtered channel impulse response estimate.

43. The non-transitory computer readable medium of claim 32, having further computer executable instructions stored thereon, which when executed by the machine cause the machine to perform further operations comprising:
filtering the final frequency response estimate to obtain a higher quality frequency response estimate for the wireless channel.

44. The non-transitory computer readable medium of claim 32, wherein the wireless communication system is an orthogonal frequency division multiplexing (OFDM) communication system.

45. The non-transitory computer readable medium of claim 32, having further computer executable instructions stored thereon, which when executed by the machine cause the machine to perform further operations comprising:
obtaining a channel gain estimate for each of the at least one subband based on a weighted sum of the channel gain estimates for the second set of subbands, wherein the weighted sum is determined based on a least-squares or a minimum mean square error (MMSE) criterion.

\* \* \* \* \*